(12) United States Patent
Ikarashi et al.

(10) Patent No.: US 11,265,155 B2
(45) Date of Patent: Mar. 1, 2022

(54) AGREEMENT SYSTEM, AGREEMENT APPARATUS, PROGRAM, AND RECORDING MEDIUM

(71) Applicant: NIPPON TELEGRAPH AND TELEPHONE CORPORATION, Chiyoda-ku (JP)

(72) Inventors: Dai Ikarashi, Musashino (JP); Koki Hamada, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 0 days.

(21) Appl. No.: 16/640,236

(22) PCT Filed: Aug. 16, 2018

(86) PCT No.: PCT/JP2018/030441
§ 371 (c)(1),
(2) Date: Feb. 19, 2020

(87) PCT Pub. No.: WO2019/039382
PCT Pub. Date: Feb. 28, 2019

(65) Prior Publication Data
US 2020/0252209 A1    Aug. 6, 2020

(30) Foreign Application Priority Data
Aug. 22, 2017  (JP) .............................. JP2017-159343

(51) Int. Cl.
*H04L 9/08* (2006.01)
*H04L 9/32* (2006.01)

(52) U.S. Cl.
CPC .......... *H04L 9/0841* (2013.01); *H04L 9/3255* (2013.01)

(58) Field of Classification Search
CPC .......................... H04L 9/0841; H04L 9/3255
(Continued)

(56) References Cited

U.S. PATENT DOCUMENTS

2017/0230182 A1* 8/2017 Misoczki ............ H04L 9/3247
2018/0307573 A1* 10/2018 Abraham ............ G06F 11/1479
(Continued)

FOREIGN PATENT DOCUMENTS

| GB | 201913115 | * | 10/2019 | ........... H04L 9/3255 |
| JP | 11-88325 A | | 3/1999 | |
| WO | WO-2019116246 A1 | * | 6/2019 | ........... H04L 9/3218 |

OTHER PUBLICATIONS

Chatterjee, "Decision Making from Multiple Crowd Opinions", IEEE, doi: 10.1109/AIKE.2019.00056, 2019, pp. 285-288. (Year: 2019).*
(Continued)

*Primary Examiner* — Peter G Shaw
(74) *Attorney, Agent, or Firm* — Oblon, McClelland, Maier & Neustadt, L.L.P.

(57) ABSTRACT

An agreement apparatus P(i) (where i=0, ..., n−1) which executes a consensus protocol generates an opinion value with a signature $X_{ij}=(x_i, sig_i(x_i))$ including an opinion value $x_i$ indicating an opinion and a signature $sig_i(x_i)$ on the opinion value $x_i$ or information different from the opinion value with the signature $X_{ij}$ as an opinion value with a signature $X'_{ij}=(x'_{ij}, e'_{ij})$ and outputs the opinion value with the signature $X'_{ij}$ to an agreement apparatus P(j) (where j=0, ..., n−1, i≠j). The agreement apparatus P(j) accepts the opinion value with the signature $X'_{ij}$ and outputs the opinion value with the signature $X'_{ij}$ or information different from the opinion value with the signature $X'_{ij}$ to an agreement apparatus P(m) (where m=0, ..., n−1, m≠i, m≠j) as an opinion value with a signature $X''_{ij}$.

9 Claims, 5 Drawing Sheets

(58) Field of Classification Search
USPC .......................................................... 713/169
See application file for complete search history.

(56) References Cited

U.S. PATENT DOCUMENTS

| | | | |
|---|---|---|---|
| 2019/0020471 A1* | 1/2019 | Santilli | G06F 16/23 |
| 2019/0158272 A1* | 5/2019 | Chopra | H04L 9/30 |
| 2019/0220768 A1* | 7/2019 | Li | G06Q 20/065 |
| 2020/0104294 A1* | 4/2020 | Alas | G06F 16/2365 |
| 2020/0134613 A1* | 4/2020 | Jiang | G06F 16/1824 |
| 2020/0201910 A1* | 6/2020 | Gavaudan | G06Q 20/3823 |
| 2021/0135879 A1* | 5/2021 | Heo | H04L 9/3257 |

OTHER PUBLICATIONS

Chatterjee et al., "Judgment Analysis Based on Crowdsourced Opinions", IEEE, doi: 10.1109/ICDE.2017.207, 2017, pp. 1439-1443. (Year: 2017).*
Kozierkiewicz-Hetmańska et al., "Assessing the quality of a Consensus determined using a multi-level approach", IEEE, doi: 10.1109/INISTA.2017.8001145, 2017, pp. 131-136. (Year: 2017).*
Zhu et al., "An Improved Proof-of-Trust Consensus Algorithm for Credible Crowdsourcing Blockchain Services", IEEE, doi: 10.1109/ACCESS.2020.2998803, pp. 102177-102187, 2020. (Year: 2020).*
International Search Report dated Nov. 20, 2018 in PCT/JP2018/030441 filed Aug. 16, 2018, 1 page.
Taniguchi, "IT TEXT Distributed Processing," 1st edition, Ohmsha Ltd. Sep. 15, 2005, 14 pages total (with partial unedited computer-generated English translation).
Beerliova-Trubiniova et al., "Efficient Byzantine Agreement with Faulty Minority," ASIACRYPT 2007, LNCS, vol. 4833, 2007, pp. 393-409.

* cited by examiner

AGREEMENT SYSTEM, AGREEMENT APPARATUS, PROGRAM, AND RECORDING MEDIUM

TECHNICAL FIELD

The present invention relates to a cryptographic technique, and, more particularly, relates to a consensus protocol.

BACKGROUND ART

In a distributed autonomous system, a plurality of apparatuses perform processing independently of each other. Processing content of these plurality of apparatuses has to be consistent with each other. As a technique for realizing this, there is a consensus protocol (see, for example, Non-patent literature 1). In the consensus protocol, a plurality of apparatuses provide values (opinion values) indicating their own opinions (such as, for example, processing order, whether or not there is a request, and content of a request) to each other, and input them in a final consensus function to obtain a consensus result (such as, for example, processing order, whether or not there is a request and content of a request) which is consistent as the whole system.

PRIOR ART LITERATURE

Non-Patent Literature

Non-patent literature 1: Zuzana Beerliova-Trubiniova, Martin Hirt, and Micha Riser, "Efficient Byzantine Agreement with Faulty Minority," ASIACRYPT 2007, LNCS 4833, pp. 393-409, 2007.

SUMMARY OF THE INVENTION

Problems to be Solved by the Invention

In a consensus protocol, a case is assumed where one apparatus intentionally or accidentally provides an illegitimate opinion value to other apparatuses or does not provide an opinion value. It is an object of the present invention to specify an apparatus which performs illegitimate processing to some extent in the consensus protocol.

Means to Solve the Problems

An agreement system which executes a consensus protocol includes n agreement apparatuses $P(0), \ldots, P(n-1)$. Note that n is an integer of 3 or greater, $i=0, \ldots, n-1$, $j=0, \ldots, n-1$, $m=0, \ldots, n-1$, $i \neq j$, $m \neq i$ and $m \neq j$. An agreement apparatus $P(i)$ generates an opinion value with a signature $X_{ij}=(x_i, \text{sig}_i(x_i))$ including an opinion value $x_i$ indicating an opinion and a signature $\text{sig}_i(x_i)$ on the opinion value $x_i$ or information different from the opinion value with the signature $X_{ij}$ as an opinion value with a signature $X'_{ij}=(x'_{ij}, e'_{ij})$ and outputs the opinion value with the signature $X'_{ij}$ to an agreement apparatus $P(j)$. The agreement apparatus $P(j)$ accepts the opinion value with the signature $X'_{ij}$ and outputs the opinion value with the signature $X'_{ij}$ or information different from the opinion value with the signature $X'_{ij}$ to an agreement apparatus $P(m)$ as the opinion value with the signature $X''_{ij}$.

Effects of the Invention

By this means, it is possible to specify an apparatus which performs illegitimate processing to some extent in a consensus protocol.

DETAILED DESCRIPTION OF THE EMBODIMENTS

An embodiment of the present invention will be described below with reference to the drawings.

Configuration

Figure 1:
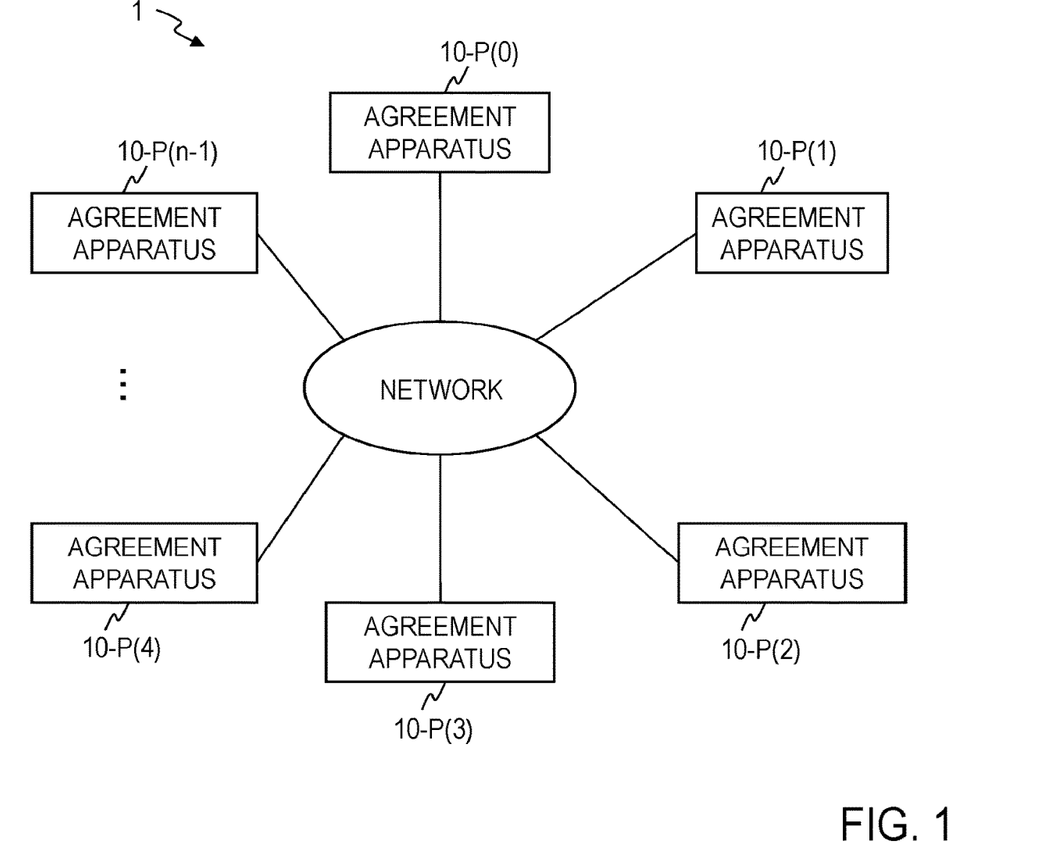
FIG. 1 is a block diagram illustrating an agreement system of an embodiment.
Figure 2:
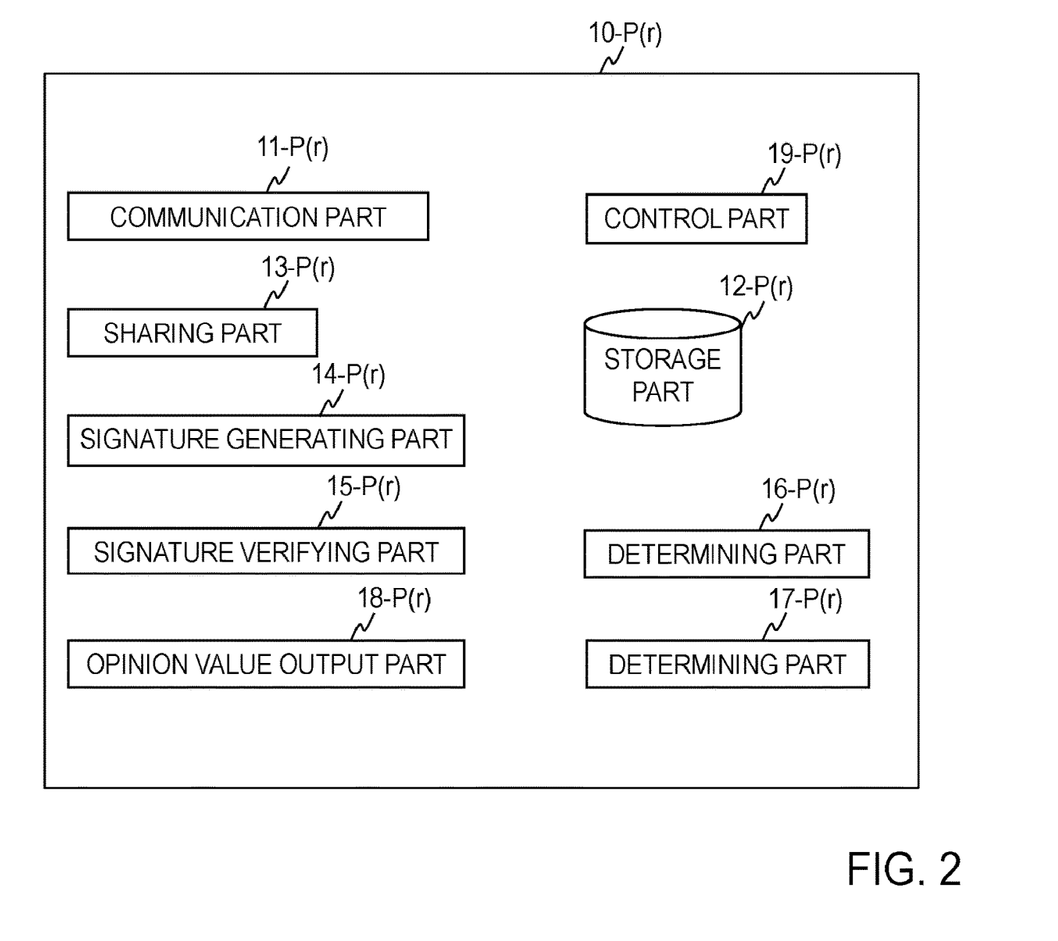
FIG. 2 is a block diagram illustrating an agreement apparatus of the embodiment.

As illustrated in FIG. 1, an agreement system 1 which executes a consensus protocol of the present embodiment is a distributed autonomous system having n agreement apparatuses $10\text{-}P(0), \ldots, 10\text{-}P(n-1)$ which can perform communication via a network. Note that n is an integer of 3 or greater (for example, $n \geq 4$), $i=0, \ldots, n-1$, $j=0, \ldots, n-1$, $r=0, \ldots, n-1$, $m=0, \ldots, n-1$, $i \neq j$, $m \neq i$ and $m \neq j$. As illustrated in FIG. 2, the agreement apparatus $10\text{-}P(r)$ includes a communication part $11\text{-}P(r)$, a storage part $12\text{-}P(r)$, a sharing part $13\text{-}P(r)$, a signature generating part $14\text{-}P(r)$, a signature verifying part $15\text{-}P(r)$, a determining part $16\text{-}P(r)$, a determining part $17\text{-}P(r)$, an opinion value output part $18\text{-}P(r)$ and a control part $19\text{-}P(r)$. Each agreement apparatus $10\text{-}P(r)$ executes each processing on the basis of control by the control part $19\text{-}P(r)$.

Provision Processing

Figure 3:
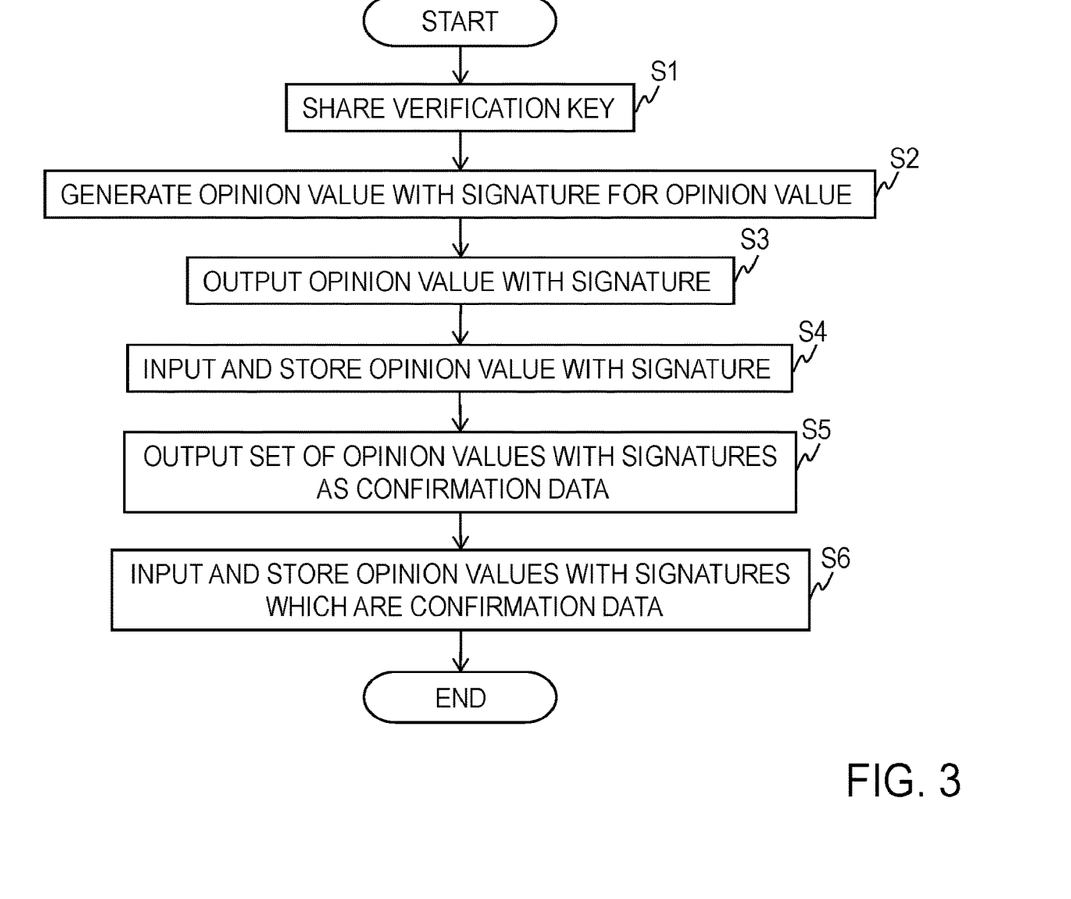
FIG. 3 is a flowchart illustrating provision processing in an agreement method of the embodiment.
Figure 5A:
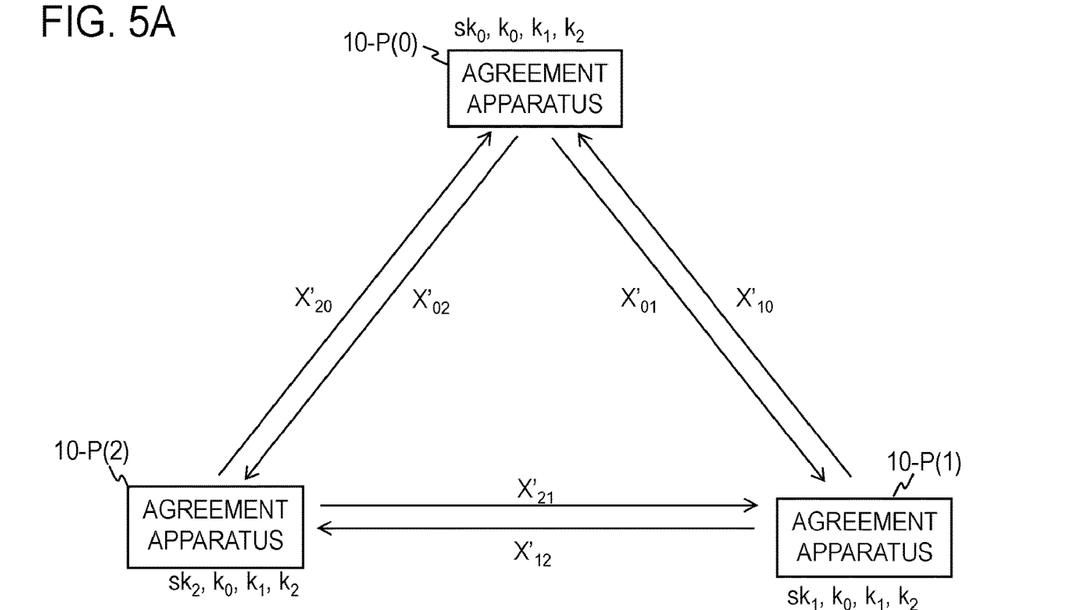
FIG. 5A and FIG. 5B are diagrams illustrating the agreement method of the embodiment.

Provision processing in which each agreement apparatus $10\text{-}P(r)$ (where $r=0, \ldots, n-1$) provides an opinion value $x_r$ indicating an own opinion will be described next using FIG. 3 and FIG. 5. The opinion value $x_r$ indicates processing content which is required to be consistent with each other at the agreement apparatuses $10\text{-}P(0), \ldots, 10\text{-}P(n-1)$. Examples of the opinion value $x_r$ include a value indicating an opinion indicating processing order. For example, in a case where a request $R_A$ for "updating a value D to 11" is transmitted from an agreement apparatus $10\text{-}P(A)$, and a request $R_B$ for "updating a value D to 9" is transmitted from an agreement apparatus $10\text{-}P(B)$ (where A, B$\in \{0, \ldots, n-1\}$), examples of the opinion value $x_r$ can include an opinion value $x_r=((A, \text{update}, D, 11), (B, \text{update}, D, 9))$ indicating an opinion of first processing the request $R_A$ and then processing the request $R_B$, and an opinion value $x_r=((B, \text{update}, D, 9), (A, \text{update}, D, 11))$ indicating an opinion of first processing the request $R_B$ and then processing the request $R_A$. If agreement can be obtained for such an opinion value $x_r$, the same processing order can be employed in the whole system. Other examples of the opinion value $x_r$ include a value indicating that a request is transmitted. For example, in a case where the request $R_A$ for "updating a value D to 11" is transmitted from the agreement apparatus 10-P(A), and the request $R_B$ for "updating a value D to 9" is transmitted from the agreement apparatus 10-P(B), examples of the opinion value $x_r$ can include an opinion value $x_r=((A, update, D, 11), (B, update, D, 9))$, indicating that the requests $R_A$ and $R_B$ are transmitted, an opinion value $x_r=(A, update, D, 11)$ indicating that only the request $R_A$ is transmitted, or the like. By using such an opinion value $x_r$, it is possible to confirm that a request is correctly provided to each apparatus. Other examples of the opinion value $x_r$ include a value indicating content of a request. For example, in a case where the request $R_A$ for "updating a value D to 11" is transmitted from the agreement apparatus 10-P(A), examples of the opinion value $x_r$ can include an opinion value $x_r=(A, update, D, 11)$ indicating that the request $R_A$ for "updating a value D to 11" is transmitted, and $x_r=(A, update, D, 9)$ indicating that the request $R_A$ for "updating a value D to 9" is transmitted. By using such an opinion value $x_r$, it is possible to confirm that the same request is provided to the respective agreement apparatuses in the whole system.

Step S1

As a premise, at each agreement apparatus 10-P(i) (where i=0, . . . , n−1), a signature generation key $sk_i$ for generating a signature, and a signature verification key $k_i$ for verifying the signature generated using the signature generation key $sk_i$ are set. The signature generation key $sk_i$ and the signature verification key $k_i$ are stored in the storage part 12-P(i) of the agreement apparatus 10-P(i). The signature generation key $sk_i$ is secret information of the agreement apparatus 10-P(i), and the signature verification key $k_i$ is public information. Examples of the signature generation key $sk_i$ include a secret key in accordance with public key cryptography (for example, RSA), and examples of the signature verification key $k_i$ include a public key in accordance with the public key cryptography. The signature generation key $sk_i$ and the signature verification key $k_i$ in this case are a pair of keys in the public key cryptography. Under this premise, the sharing part 13-P(i) of the agreement apparatus 10-P(i) (where i=0, . . . , n−1) shares the signature verification key $k_i$ with the sharing part 13-P(j) of the agreement apparatus 10-P(j) (where j=0, . . . , n−1, j≠i) other than the agreement apparatus 10-P(i) (where i=0, . . . , n−1). The signature verification key $k_i$ is shared between the sharing part 13-P(i) and the sharing part 13-P(j) by, for example, the sharing part 13-P(i) transmitting the signature verification key $k_i$ or a value corresponding to the signature verification key $k_i$ to the sharing part 13-P(j). Alternatively, the signature verification key $k_i$ or information corresponding to the signature verification key $k_i$ may be stored in a server apparatus which is public on a network, and each sharing part 13-P(j) may receive the signature verification key $k_i$ or information corresponding to the signature verification key $k_i$ from this server apparatus. The signature verification key $k_i$ is stored in the storage part 12-P(j) of the agreement apparatus 10-P(j). By this means, in the storage part 12-P(j) of each agreement apparatus 10-P(j) (where j=0, . . . , n−1, j≠i), in addition to the own signature generation key $sk_j$ and signature verification key $k_j$, signature verification keys $k_i$ (where i=0, . . . , n−1, i≠j) of n−1 other agreement apparatuses 10-P(i) are stored. For example, in a case where n=3, $sk_0, k_0, k_1, k_2$ are stored in the storage part 12-P(0) of the agreement apparatus 10-P(0), $sk_1, k_0, k_1, k_2$ are stored in the storage part 12-P(1) of the agreement apparatus 10-P(1), and $sk_2, k_0, k_1, k_2$ are stored in the storage part 12-P(2) of the agreement apparatus 10-P(2) (FIG. 5A). The processing then proceeds to step S2.

Step S2

In the signature generating part 14-P(i) of the agreement apparatus 10-P(i) (where i=0, . . . , n−1), an opinion value $x_i$ indicating an opinion and the signature generation key $sk_i$ read from the storage part 12-P(i) are input. The agreement apparatus 10-P(i) may perform legitimate processing or may perform illegitimate processing. In a case where the agreement apparatus 10-P(i) performs legitimate processing, the signature generating part 14-P(i) generates an opinion value with a signature $X_{ij}=(x_i, sig_i(x_i))$ including the opinion value $x_i$ and a signature $sig_i(x_i)$ on the opinion value $x_i$ using the signature generation key $sk_i$ and outputs the opinion value $X_{ij}$ as an opinion value with a signature $X'_{ij}=(x'_{ij}, e'_{ij})$. Note that, in a case where the signature generation key $sk_i$ is a secret key in accordance with the public key cryptography, the signature $sig_i(x_i)$ is encrypted text obtained by encrypting the opinion value $x_i$ using, for example, the signature generation key $sk_i$ in accordance with the public key cryptography. Meanwhile, in a case where the agreement apparatus 10-P(i) performs illegitimate processing, the signature generating part 14-P(i) generates and outputs information different from the opinion value with the signature $X_{ij}$ as the opinion value with the signature $X'_{ij}=(x'_{ij}, e'_{ij})$. The opinion value with the signature $X'_{ij}$ is transmitted to the communication part 11-P(i).

Step S3

The communication part 11-P(i) (first output part) of the agreement apparatus 10-P(i) (where i=0, . . . , n−1) which performs legitimate processing outputs the opinion value with the signature $X'_{ij}=(x'_{ij}, e'_{ij})$ to n−1 agreement apparatuses 10-P(j) (where j=0, . . . , n−1, j≠i). For example, in a case where n=3, the agreement apparatus 10-P(0) transmits an opinion value with a signature $X'_{01}$ to the agreement apparatus 10-P(1), and transmits an opinion value with a signature $X'_{02}$ to the agreement apparatus 10-P(2), the agreement apparatus 10-P(1) transmits an opinion value with a signature $X'_{10}$ to the agreement apparatus 10-P(0) and transmits an opinion value with a signature $X'_{12}$ to the agreement apparatus 10-P(2), and the agreement apparatus 10-P(2) transmits an opinion value with a signature $X'_{20}$ to the agreement apparatus 10-P(0) and transmits an opinion value with a signature $X'_{21}$ to the agreement apparatus 10-P(1) (FIG. 5A). In a case where the agreement apparatus 10-P(i) executes legitimate processing, $X'_{ij}=(x'_{ij}, e'_{ij})=X_{ij}=(x_i, sig_i(x_i))$. The communication part 11-P(i) of the agreement apparatus 10=P(i) which performs illegitimate processing outputs information different from the opinion value with the signature $X_{ij}=(x_i, sig_i(x_i))$ to the agreement apparatus 10-P(j) as the opinion value with the signature $X'_{ij}=(x'_{ij}, e'_{ij})$. That is, the communication part 11-P(i) outputs the opinion value with the signature $X_{ij}=(x_i, sig_i(x_i))$ or information different from the opinion value with the signature $X_{ij}$ to the agreement apparatus 10-P(j) as the opinion value with the signature $X'_{ij}=(x'_{ij}, e'_{ij})$. The communication part 11-P(i) of the agreement apparatus 10-P(i) which performs illegitimate processing may not output the opinion value with the signature $X'_{ij}=(x'_{ij}, e'_{ij})$ to at least part of the agreement apparatuses 10-P(j).

Step S4

The opinion value with the signature $X'_{ij}$ output from the agreement apparatus 10-P(i) is transmitted to the agreement apparatus 10-P(j) (where j=0, ..., n−1, j≠i) via a network. The opinion value with the signature $X'_{ij}$ is input (accepted) at the communication part 11-P(j) (first input part) of the agreement apparatus 10-P(j) and stored in the storage part 12-P(j). For example, in a case where n=3, an opinion value with a signature $X'_{10}$ and an opinion value with a signature $X'_{20}$ are stored in the storage part 12-P(0) of the agreement apparatus 10-P(0), an opinion value with a signature $X'_{01}$ and an opinion value with a signature $X'_{21}$ are stored in the storage part 12-P(1) of the agreement apparatus 10-P(1), and an opinion value with a signature $X'_{02}$ and an opinion value with a signature $X'_{12}$ are stored in the storage part 12-P(2) of the agreement apparatus 10-P(2) (FIG. 5B).

Step S5

A communication part 11-P(j) (second output part) of the agreement apparatus 10-P(j) (where j=0, ..., n−1, j≠i) which performs legitimate processing outputs an opinion value with a signature $X''_{ij}=(x''_{ij}, e''_{ij})$ (where i=0, ..., n−1, i≠j) to n−1 agreement apparatuses 10-P(m) (where m=0, ..., n−1, m≠j). In a case where the agreement apparatus 10-P(j) executes legitimate processing, the opinion value with the signature $X''_{ij}$ is $X'_{ij}$ stored in the storage part 12-P(j), and $X''_{ij}=(x''_{ij}, e''_{ij})=X'_{ij}=(x'_{ij}, e'_{ij})$. However, there is a possibility that any of the agreement apparatuses 10-P(j) performs illegitimate processing, the communication part 11-P(j) of the agreement apparatus 10-P(j) which performs illegitimate processing outputs information different from the opinion value with the signature $X'_{ij}=(x'_{ij}, e'_{ij})$ to the agreement apparatus 10-P(m) as the opinion value with the signature $X''_{ij}=(x''_{ij}, e''_{ij})$. That is, the communication part 11-P(j) outputs the opinion value with the signature $X'_{ij}=(x'_{ij}, e'_{ij})$ or information different from the opinion value with the signature $X'_{ij}$ to the agreement apparatus 10-P(m) as the opinion value with the signature $X''_{ij}=(x''_{ij}, e''_{ij})$. A set of n−1 opinion values with signatures $X''_{0j}, ..., X''_{(j-1)j}, X''_{(j+1)j}, ..., X''_{(n-1)j}$ output from the communication part 11-P(j) to the agreement apparatus 10-P(m) is expressed as confirmation data $C_j=X''_{0j}, ..., X''_{(j-1)j}, X''_{(j+1)j}, ..., X''_{(n-1)j}$. For example, in a case where n=3, the communication part 11-P(0) outputs confirmation data $C_0=X''_{10}, X''_{20}$ to the agreement apparatuses 10-P(1) and P(2), the communication part 11-P(1) outputs confirmation data $C_1=X''_{01}, X''_{21}$ to the agreement apparatuses 10-P(0) and P(2), and the communication part 11-P(2) outputs confirmation data $C_2=X''_{02}, X''_{12}$ to the agreement apparatuses 10-P(0) and P(1) (FIG. 5B). The communication part 11-P(j) of the agreement apparatus 10-P(j) (where j=0, ..., n−1, j≠i) which performs illegitimate processing may not output the confirmation data $C_j$ to at least part of the agreement apparatuses 10-P(m).

Step S6

The confirmation data $C_j$ output from the communication part 11-P(j) is transmitted to the agreement apparatus 10-P(m) (where m=0, ..., n−1, m≠j) via a network. The confirmation data $C_j$ is input (accepted) at the communication part 11-P(m) (second input part) of the agreement apparatus 10-P(m), and stored in the storage part 12-P(m). For example, in a case where n=3, confirmation data $C_1=X''_{01}, X''_{21}$ and $C_2=X''_{02}, X''_{12}$ are stored in the storage part 12-P(0), confirmation data $C_0=X''_{10}, X''_{20}$ and $C_2=X''_{02}, X''_{12}$ are stored in the storage part 12-P(1), and confirmation data $C_0=X''_{10}, X''_{20}$ and $C_1=X''_{01}, X''_{21}$ are stored in the storage part 12-P(2) (FIG. 5B).

Verification Processing

Figure 4:
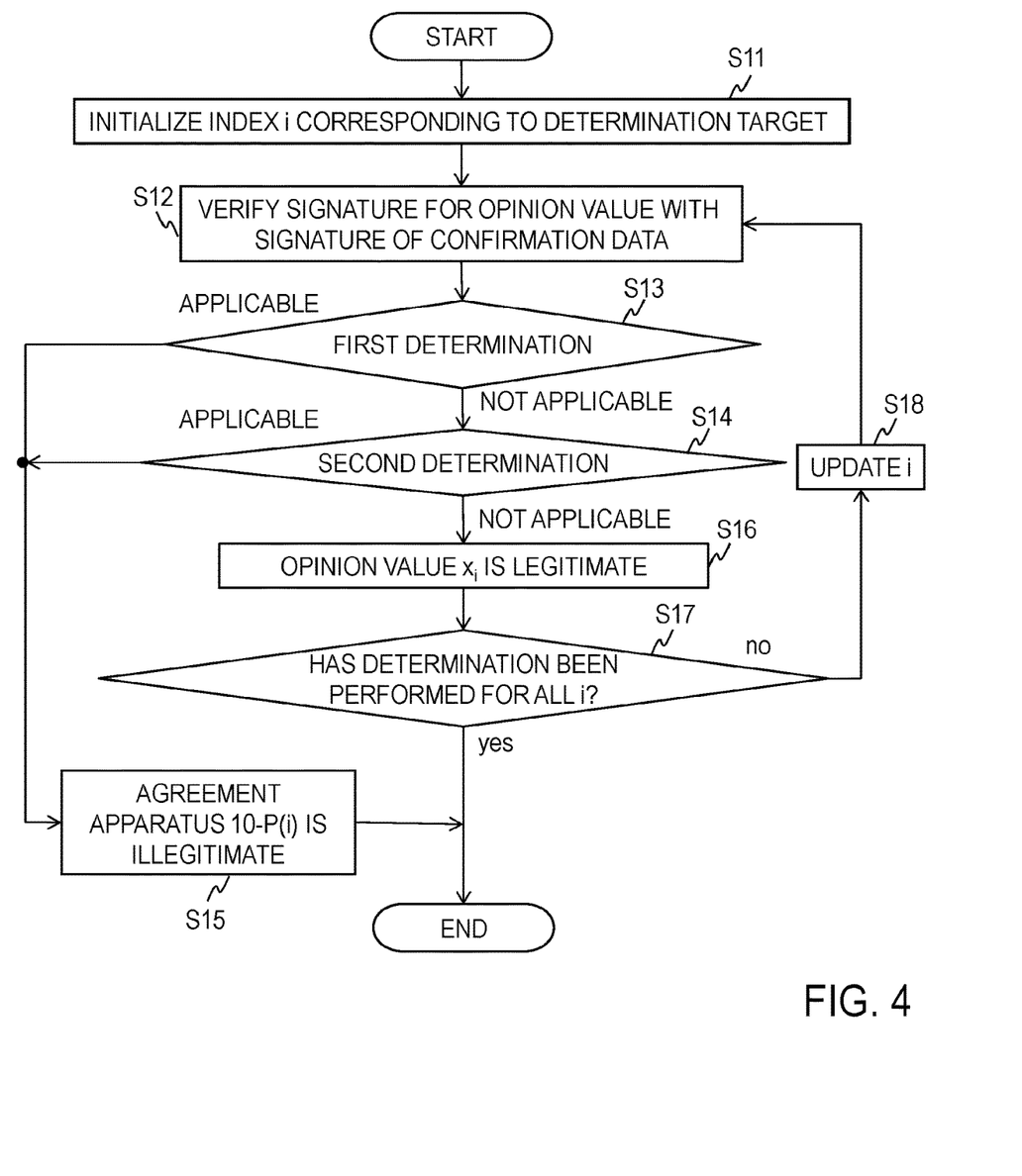
FIG. 4 is a flowchart illustrating verification processing in the agreement method of the embodiment.

Verification processing of an opinion value performed by each agreement apparatus 10-P(m) (where m=0, ..., n−1) will be described next using FIG. 4 and FIG. 5B. However, it is assumed that there is one or less agreement apparatus which performs illegitimate processing. The verification processing is executed after the provision processing described above. The verification processing may be executed by being triggered by the provision processing being performed, or may be executed at a predetermined timing after the provision processing. The verification processing may be performed by all or only part of the agreement apparatuses 10-P(0), ..., 10-P(n−1).

Step S11

First, the control part 19-P(m) of the agreement apparatus 10-P(m) initializes an index i∈{0, ..., n−1} corresponding to a determination target. For example, if m≠0, the control part 19-P(m) initializes i to 0, and, if m=0, the control part 19-P(m) initializes i to 1.

Step S12

The signature verifying part 15-P(m) of the agreement apparatus 10-P(m) reads the opinion values with the signatures $X''_{i0}, ..., X''_{i(i-1)}, X''_{i(i+1)}, ..., X''_{i(n-1)}$ for the index i included in the confirmation data $C_0, ..., C_{n-1}$ and the signature verification key $k_i$ (where i=0, ..., n−1, i≠j) from the storage part 12-P(m), verifies the signatures for the respective opinion values with the signatures $X''_{i0}, ..., X''_{i(i-1)}, X''_{i(i+1)}, ..., X''_{i(n-1)}$ using these and outputs results of them $V(X''_{i0}), ..., V(X''_{i(i-1)}), V(X''_{i(i+1)})), ..., V(X''_{i(n-1)})$. That is, in a case where the opinion value with the signature $X''_{ij}$ accepted (input) at the communication part 11-P(m) (second input part) is in correct relationship with the signature verification key $k_i$ corresponding to the agreement apparatus 10-P(i) (in a case where the signature is legitimate), the signature verifying part 15-P(m) determines that a result of signature verification for the opinion value with the signature $X''_{ij}$ as pass and outputs a result $V(X''_{ij})=$OK indicating the pass. Otherwise, the signature verifying part 15-P(m) determines the result of signature verification for the opinion value with the signature $X''_{ij}$ as fail, and outputs a result $V(X''_{ij})=$NG indicating the fail. For example, in a case where the opinion value with the signature $X''_{ij}$ is not accepted (input) at the communication part 11-P(m), in a case where the opinion value with the signature $X''_{ij}$ accepted at the communication part 11-P(m) does not have a prescribed form, or in a case where the opinion value with the signature $X''_{ij}$ accepted at the communication part 11-P(m) is not in correct relationship with the signature verification key $k_i$ (in a case where the signature is illegitimate), the signature verifying part 15-P(m) determines a result of signature verification for the opinion value with the signature $X''_{ij}$ as fail and outputs $V(X''_{ij})=$NG indicating the fail.

In a case where the signature verification key $k_i$ is a public key in accordance with the public key cryptography, determination as to whether or not the opinion value with the signature $X''_{ij}$ is in correct relationship with the signature verification key $k_i$ (whether the signature is legitimate or illegitimate) is performed, for example, as follows. First, the signature verifying part 15-P(m) decrypts encrypted text $e''_{ij}$ included in the opinion value with the signature $X''_{ij}=(x''_{ij}, e''_{ij})$ using the signature verification key $k_i$ in accordance with the public key cryptography described above to obtain a decryption result $x''_i = dec_{k\_i}(e''_{ij})$. Here, if the opinion value with the signature $X''_{ij}$ is correctly generated, $X''_{ij} = (x''_{ij}, e''_{ij}) = (x_i, sig\_i(x_i))$, and $x''_i = dec_{k\_i}(e''_{ij}) = dec_{k\_i}(sig\_i(x_i)) = xi$. Then, the signature verifying part 15-P(m) determines whether or not $x''_{ij} = x''_i$ is satisfied. Here, if $x''_{ij} = x''_i$ is satisfied, the signature verifying part 15-P(m) determines that the opinion value with the signature $X''_{ij}$ is in correct relationship with the signature verification key $k_i$ (the signature is legitimate). Meanwhile, in a case where $x''_{ij} = x''_i$ is not satisfied ($x''_{ij} \neq x''_i$), the signature verifying part 15-P(m) determines that the opinion value with the signature $X''_{ij}$ is not in correct relationship with the signature verification key $k_i$ (the signature is illegitimate).

Figure 5B:
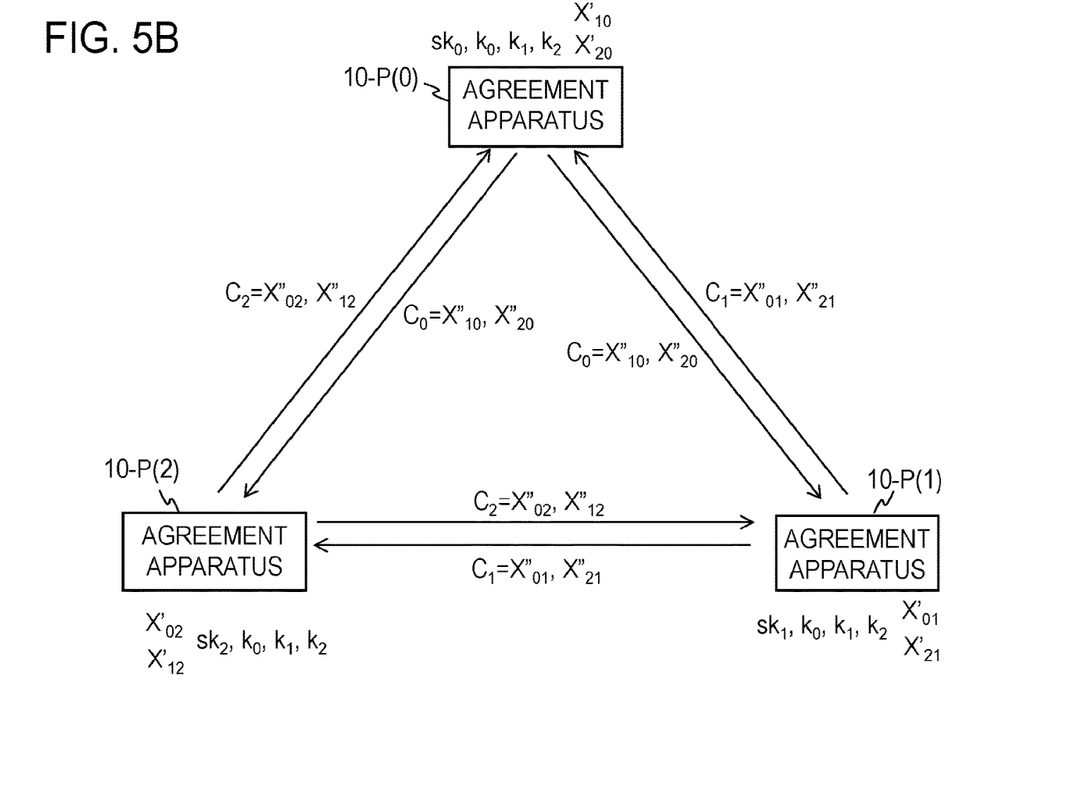

For example, in a case where n=3 and i=1, the signature verifying part 15-P(0) verifies a signature for an opinion value with a signature $X''_{12}$ and outputs its result $V(X''_{12})$, and, in a case where n=3 and i=0, the signature verifying part 15-P(1) verifies a signature for an opinion value with a signature $X''_{02}$ and outputs its result $V(X''_{02})$, and in a case where n=3 and i=0, the signature verifying part 15-P(2) verifies a signature for an opinion value with a signature $X''_{01}$ and outputs its result $V(X''_{01})$ (FIG. 5B).

Step S13

The opinion value with the signature $X''_{ij}$ for the index i and the result $V(X''_{ij})$ (where j=0, ..., n−1, j≠i) of signature verification for the index i output from the agreement apparatus 10-P(m) are input to the determining part 16-P(m) (first determining part). Further, an opinion value with a signature $X'_{im}$ for the index i read from the storage part 12-P(m) is input to the determining part 16-P(m). The opinion value with the signature $X'_{im} = (X'_{im}, e'_{im})$ is transmitted from the agreement apparatus 10-P(i) to the agreement apparatus 10-P(m) in step S4 described above, and is stored in the storage part 12-P(m). The determining part 16-P(m) determines whether the case corresponds to at least one of the following (1-1) and (1-2).

(1-1) Among the opinion values with the signatures $X''_{ij}$, results of signature verification for at least two opinion values with signatures of an opinion value with a signature $X''_{iy} = (x''_{iy}, e''_{iy})$ and an opinion value with a signature $X''_{iz} = (x''_{iz}, e''_{iz})$ (where y, z ∈ {0, ..., i−1, i+1, ..., n−1} and y≠z) are pass ($V(X''_{iy}) = V(X''_{iz}) = OK$), and the opinion value $x''_{iy}$ included in the opinion value with the signature $X''_{iy}$ and the opinion value $x''_{iz}$ included in the opinion value with the signature $X''_{iz}$ differ from each other ($x''_{iy} \neq x''_{iz}$).

(1-2) A result of signature verification for the opinion value with the signature $X''_{iy} = (x''_{iy}, e''_{iy})$ is pass ($V(X''_{iy}) = OK$), and the opinion value $x''_{iy}$ included in the opinion value with the signature $X''_{iy}$ and the opinion value $x'_{im}$ included in the opinion value with the signature $X'_{im} = (x'_{im}, e'_{im})$ differ from each other ($x''_{iy} \neq x'_{im}$).

In a case where it is determined in step S13 that the case corresponds to at least one of (1-1) and (1-2), the determining part 16-P(m) determines that there is illegitimacy at the agreement apparatus 10-P(i) and outputs that there is illegitimacy at the agreement apparatus 10-P(i). That is, a case which corresponds to (1-1) is a case where $X''_{iy} = X_{iy}$ and $X''_{iz} = X_{iz}$, and these are generated at the agreement apparatus 10-P(i). However, while $x''_{iy}$ originally should be $x''_{iy} = x''_{iz} = x_i$, $x''_{iy}$ becomes $x''_{iy} \neq x''_{iz}$. An apparatus which can perform such illegitimacy is only the agreement apparatus 10-P(i) which generates the signature. Therefore, it is possible to determine that there is illegitimacy at the agreement apparatus 10-P(i). Further, a case which corresponds to (1-2) is a case where the opinion value with the signature $X''_{iy}$ is $X''_{iy} = X_{iy}$, and this signature is generated at the agreement apparatus 10-P(i). However, while $x''_{iy}$ originally should be $x''_{iy} = x''_{im} = x_i$, $x''_{iy}$ becomes $x''_{iy} \neq x''_{im}$. Such illegitimacy is performed when the agreement apparatus 10-P(i) generates the opinion value with the signature $X'_{iy}$ or when the agreement apparatus 10-P(i) transmits the opinion value with the signature $X'_{im}$ to the agreement apparatus 10-P(m) in step S4 described above. Therefore, it is possible to determine that there is illegitimacy at the agreement apparatus 10-P(i). In a case where information indicating that there is illegitimacy at the agreement apparatus 10-P(i) is output, the verification processing is finished (step S15).

Step S14

Meanwhile, in a case where it is determined in step S13 that the case corresponds to neither (1-1) nor (1-2), the opinion value with the signature $X''_{ij}$ for the index i and a result $V(X''_{ij})$ (where j=0, ..., n−1, j≠i) of signature verification for the index i output from the agreement apparatus 10-P(m) are input to the determining part 17-P(m) (second determining part). The determining part 17-P(m) determines whether the case corresponds to the following (2-1).

(2-1) Among the opinion values with the signatures $X''_{ij}$, results of signature verification for at least any two opinion values of an opinion value with a signature $X''_{iy} = (x''_{iy}, e''_{iy})$ and an opinion value with a signature $X''_{iz} = (x''_{iz}, e''_{iz})$ (where y, z ∈ {0, ..., i−1, i+1, ..., n−1} and y≠z) are fail ($V(X''_{iy}) = V(X''_{iz}) = NG$).

In a case where it is determined in step S14 that the case corresponds to (2-1), the determining part 16-P(m) determines that there is illegitimacy at the agreement apparatus 10-P(i) and outputs that there is illegitimacy at the agreement apparatus 10-P(i). That is, a case which corresponds to (2-1) is a case where the agreement apparatus 10-P(i) outputs an illegitimate opinion value with a signature $X'_{iy} \neq (x_i, sig\_i(x_i))$ and an illegitimate opinion value with a signature $X'_{iz} \neq (x_i, sig\_i(x_i))$ in step S3, or a case where at least two agreement apparatuses 10-P(y) and 10-P(z) output an illegitimate opinion value with a signature $X''_{iy} \neq X'_{iy} = (x_i, sig\_i(x_i))$ and an illegitimate opinion value with a signature $X''_{iz} \neq X'_{iz} = (x_i, sig\_i(x_i))$ in step S5. However, under a premise where there is one or less agreement apparatus which performs illegitimacy, because the latter is excluded, it is possible to determine that there is illegitimacy at the agreement apparatus 10-P(i). In a case where information indicating that there is illegitimacy at the agreement apparatus 10-P(i) is output, the verification processing is finished (step S15).

Step S16

In a case where it is determined in step S14 that the case does not correspond to (2-1), the opinion value output part 18-P(m) extracts one opinion value with a signature $X''_{ij} = (x''_{ij}, e''_{ij})$ from the storage part 12-P(m) and outputs the opinion value $x''_{ij}$ included in the opinion value with the signature as a legitimate opinion value $x_i$ of the agreement apparatus 10-P(i) (step S16).

Step S17

Then, the control part 19-P(m) determines whether or not determination (step S12 to S16) has been finished for all i ∈ {0, ..., n−1} except m (step S17). In a case where determination has finished for all i ∈ {0, ..., n−1} except m, the verification processing is finished. Meanwhile, in a case where determination has not been finished for all i∈ {0, . . . , n−1} except m, the control part 19-P(m) updates the index i to a value which is not yet selected and returns the processing to step S12 (step S18).

Modified Examples, or the Like

Note that the present invention is not limited to the above-described embodiment. For example, while it has been assumed in the above-described verification processing that there is one or less agreement apparatus which performs illegitimacy, the present invention can be applied even if this assumption is not provided. In this case, while it is possible to determine that there is illegitimacy at the agreement apparatus 10-P(i) when it is determined in step S13 that the case corresponds to at least one of (1-1) and (1-2), it is not possible to immediately determine that there is illegitimacy at the agreement apparatus 10-P(i) even in a case where it is determined in step S14 that the case corresponds to (2-1). However, also in this case, it is at least possible to detect that there is illegitimacy, and it is possible to specify an apparatus which performs illegitimacy to some extent. Further, only one of step S13 and step S14 may be executed.

Further, in a case where the determining part 16-P(m) or 17-P(m) cannot further accept (receive input of) the opinion value with the signature $X'_{im}$ at the communication part 11-P(m) in step S4, or in a case where the accepted $X'_{im}$ does not have a prescribed form, it is also possible to determine that there is illegitimacy at the agreement apparatus 10-P(i) and output that there is illegitimacy at the agreement apparatus 10-P(i). Further, while, in the above-described embodiment, a signature is generated using the public key cryptography, a signature may be generated using common key cryptography.

Further, while, in the above-described embodiment, the agreement system 1 is a distributed autonomous system, the agreement system 1 may be a centralized system. The above-described various kinds of processing may be executed in parallel or individually in accordance with processing performance of apparatuses which execute the processing or as necessary as well as being executed in chronological order in accordance with description. Further, it goes without saying that change can be made as appropriate within a scope not deviating from the gist of the present invention.

The above-described each apparatus is, for example, configured by a general-purpose or dedicated computer which includes a processor (hardware processor) such as a CPU (central processing unit), a memory such as a RAM (random-access memory) and a ROM (read-only memory), or the like, executing a predetermined program. This computer includes one processor and one memory, or may include a plurality of processors and a plurality of memories. This program may be installed on a computer, or may be recorded in a ROM, or the like, in advance. Further, part or all of processing parts may be configured not using electronic circuitry which realizes functions and configurations by a program being read like a CPU, but using electronic circuitry which realizes processing functions without using a program. Electronic circuitry which configures one apparatus may include a plurality of CPUs.

In a case where the above-described configuration is realized using a computer, processing content of functions to be provided at each apparatus is described with a program By this program being executed at the computer, the above-described processing functions are implemented on the computer. The program which describes this processing content can be recorded in a computer-readable recording medium. Examples of the computer-readable recording medium include a non-transitory recording medium. Examples of such a recording medium include a magnetic recording device, an optical disk, a magneto-optical recording medium, a semiconductor memory, or the like.

This program is distributed by, for example, a portable recording medium such as a DVD and a CD-ROM in which the program is recorded being sold, handed over, lent, or the like. Further, it is also possible to employ a configuration where this program is stored in a storage device of a server computer and is distributed by transferring the program from the server computer to other computers via a network.

A computer which executes such a program, for example, first, once stores the program recorded in a portable recording medium or the program transferred from the server computer in the own storage device. Upon execution of the processing, this computer reads the program stored in the own storage device and executes processing in accordance with the read program. As another form of executing this program, it is also possible to employ a configuration where the computer directly reads the program from a portable recording medium and executes processing in accordance with the program, or the computer sequentially executes processing in accordance with the received program every time the program is transferred from the server computer to this computer. It is also possible to employ a configuration where the above-described processing is executed using so-called ASP (Application Service Provider) service which implements processing functions only by acquisition of an execution instruction and a result without the program being transferred from the server computer to this computer.

Instead of the processing functions of the present apparatus being implemented by a predetermined program being executed on a computer, at least part of these processing functions may be implemented on hardware.

INDUSTRIAL APPLICABILITY

The present invention can be utilized in, for example, a secret computation system, or the like.

DESCRIPTION OF REFERENCE NUMERALS

1 agreement system
10-P(0), . . . , 10-P(n−1) agreement apparatus

What is claimed is:
1. An agreement system which executes a consensus protocol, the agreement system comprising:
n agreement apparatuses P(0), . . . , P(n−1),
where n is an integer of 3 or greater, i=0, . . . , n−1, j=0, . . . , n−1, m=0, . . . , n−1, i≠j, m≠i and m≠j,
wherein an agreement apparatus P(i) comprises processing circuitry configured to:
generate an opinion value with a signature $X_{ij}=(x_i, \text{sig}_{\_j}(x_i))$ including an opinion value $x_i$ indicating an opinion and a signature $\text{sig}_{\_j}(x_i)$ on the opinion value $x_i$ or information different from the opinion value with the signature $X_{ij}$ as an opinion value with a signature $X'_{ij}=(x'_{ij}, e'_{ij})$; and
output the opinion with the signature $X'_{ij}$ to an agreement apparatus P(j), the agreement apparatus P(j) comprises processing circuitry configured to:
  accept the opinion value with the signature $X'_{ij}$; and
  output the opinion value with the signature $X'_{ij}$ or information different from the opinion value with the signature $X'_{ij}$ to an agreement apparatus P(m) as an opinion value with a signature $X''_{ij}$,
wherein the agreement apparatus P(m) comprises processing circuitry configured to determine whether there is illegitimacy at the agreement apparatus P(i) based on the received outputs of the agreement apparatus P(i) and the agreement apparatus P(j).

2. The agreement system according to claim 1,
wherein the processing circuitry of the agreement apparatus P(m) is configured to:
  accept the opinion value with the signature $X''_{ij}=(x''_{ij}, e''_{ij})$ output from the agreement apparatus P(j) and an opinion value with a signature $X'_{im}=(x'_{im}, e'_{im})$ output from the agreement apparatus P(i);
  verify a signature for the opinion value with the signature $X''_{ij}$; and
  determine that there is illegitimacy at the agreement apparatus P(i) in a case where (1), among the opinion values with the signatures $X''_{ij}$, results of signature verification for at least any two opinion values of an opinion value with a signature $X''_{iy}=(x''_{iy}, e''_{iy})$ and an opinion value with a signature $X''_{iz}=(x''_{iz}, e''_{iz})$ (where $y, z \in \{0, \ldots, i-1, i+1, \ldots, n-1\}$ and $y \neq z$) are pass, and an opinion value $x''_{iy}$ included in the opinion value with the signature $X''_{iy}$ and an opinion value $x''_{iz}$ included in the opinion value with the signature $X''_{iz}$ differ from each other, and/or, in a case where (2) a result of signature verification for the opinion value with the signature $X''_{iy}=(x''_{iy}, e''_{iy})$ is pass, and the opinion value $x''_{iy}$ included in the opinion value with the signature $X''_{iy}$ and an opinion value $x'_{im}$ included in the opinion value with the signature $X'_{im}=(x'_{im}, e'_{im})$ differ from each other.

3. The agreement system according to claim 1 or 2,
wherein the processing circuitry of the agreement apparatus P(m) is configured to:
accept the opinion value with the signature $X''_{ij}=(x''_{ij}, e''_{ij})$ output from the agreement apparatus P(j);
verify a signature for the opinion value with the signature $X''_{ij}$; and
determine that there is illegitimacy at the agreement apparatus P(i) in a case where, among the opinion values with the signatures $X''_{ij}$, results of signature verification for at least any two opinion values of an opinion value with a signature $X''_{iy}=(x''_{iy}, e''_{iy})$ and an opinion value with a signature $X''_{iz}=(x''_{iz}, e''_{iz})$ (where $y, z \in \{0, \ldots, i-1, i+1, \ldots, n-1\}$, and $y \neq z$) are fail.

4. The agreement system according to claim 3,
wherein the processing circuitry of the agreement apparatus P(m) determines that a result of signature verification for the opinion value with the signature $X''_{ij}$ is pass in a case where the opinion value with the signature $X''_{ij}$ accepted at the second input part is in correct relationship with a verification key $k_i$ corresponding to the agreement apparatus P(i), and
determines that the result of signature verification for the opinion value with the signature $X''_{ij}$ is fail in a case where the opinion value with the signature $X''_{ij}$ is not accepted at the second input part, in a case where the opinion value with the signature $X''_{ij}$ accepted at the second input part does not have a prescribed form, or in a case where the opinion value with the signature $X''_{ij}$ accepted at the second input part is not in correct relationship with the verification key $k_i$.

5. The agreement system according to claim 2,
wherein the processing circuitry of the agreement apparatus P(m) determines that a result of signature verification for the opinion value with the signature $X''_{ij}$ is pass in a case where the opinion value with the signature $X''_{ij}$ accepted at the second input part is in correct relationship with a verification key $k_i$ corresponding to the agreement apparatus P(i), and
determines that the result of signature verification for the opinion value with the signature $X''_{ij}$ is fail in a case where the opinion value with the signature $X''_{ij}$ is not accepted at the second input part, in a case where the opinion value with the signature $X''_{ij}$ accepted at the second input part does not have a prescribed form, or in a case where the opinion value with the signature $X''_{ij}$ accepted at the second input part is not in correct relationship with the verification key $k_i$.

6. An agreement apparatus provided in the agreement system according to claim 1.

7. An agreement apparatus P(m) of an agreement system having n agreement apparatuses P(0), ..., P(n−1) which execute a consensus protocol,
  where n is an integer of 3 or greater, $i=0, \ldots, n-1$, $j=0, \ldots, n-1$, $m=0, \ldots, n-1$, $i \neq j$, $m \neq i$ and $m \neq j$, the agreement apparatus comprising processing circuitry configured to:
  accept an opinion value with a signature $X''_{ij}=(x''_{ij}, e''_{ij})$ output from an agreement apparatus P(j) and an opinion value with a signature $X'_{im}=(x'_{im}, e'_{im})$ output from an agreement apparatus P(i);
  verify a signature for the opinion value with the signature $X''_{ij}$; and
  determine that there is illegitimacy at the agreement apparatus P(i) in a case where (1), among the opinion values with the signatures $X''_{ij}$, results of signature verification for at least any two opinion values of an opinion value with a signature $X''_{iy}=(x''_{iy}, e''_{iy})$ and an opinion value with a signature $X''_{iz}=(x''_{iz}, e''_{iz})$ (where $y, z \in \{0, \ldots, i-1, i+1, \ldots, n-1\}$ and $y \neq z$) are pass, and an opinion value $x''_{iy}$ included in the opinion value with the signature $X''_{iy}$ and an opinion value $x''_{iz}$ included in the opinion value with the signature $X''_{iz}$ differ from each other, and/or, in a case where (2) a result of signature verification for the opinion value with the signature $X''_{iy}=(x''_{iy}, e''_{iy})$ is pass, and the opinion value $x''_{iy}$ included in the opinion value with the signature $X''_{iy}$ and an opinion value $x'_{im}$ included in the opinion value with the signature $X'_{im}=(x'_{im}, e'_{im})$ differ from each other.

8. An agreement apparatus P(m) of an agreement system having n agreement apparatuses P(0), ..., P(n−1) which execute a consensus protocol,
  where n is an integer of 3 or greater, $i=0, \ldots, n-1$, $j=0, \ldots, n-1$, $m=0, \ldots, n-1$, $i \neq j$, $m \neq i$ and $m \neq j$, the agreement apparatus comprising processing circuitry configured to:
  accept an opinion value with a signature $X''_{ij}=(x''_{ij}, e''_{ij})$ output from an agreement apparatus P(j);
  verify a signature for the opinion value with the signature $X''_{ij}$; and
  determine that there is illegitimacy at the agreement apparatus P(i) in a case where, among the opinion values with the signatures $X''_{ij}$, results of signature verification for at least any two opinion values of an opinion value with a signature $X''_{iy}=(x''_{iy}, e''_{iy})$ and an opinion value with a signature $X''_{iz}=(x''_{iz}, e''_{iz})$ (where $y, z \in \{0, \ldots, i-1, i+1, \ldots, n-1\}$ and $y \neq z$) are fail.

9. A non-transitory computer-readable recording medium having a program for causing a computer to function as the agreement apparatus according to any one of claims 6 to 8 stored therein.

* * * * *